Aug. 23, 1927.
H. ELLISON
WIND ROTOR
Filed June 10, 1926   2 Sheets-Sheet 1
1,640,269
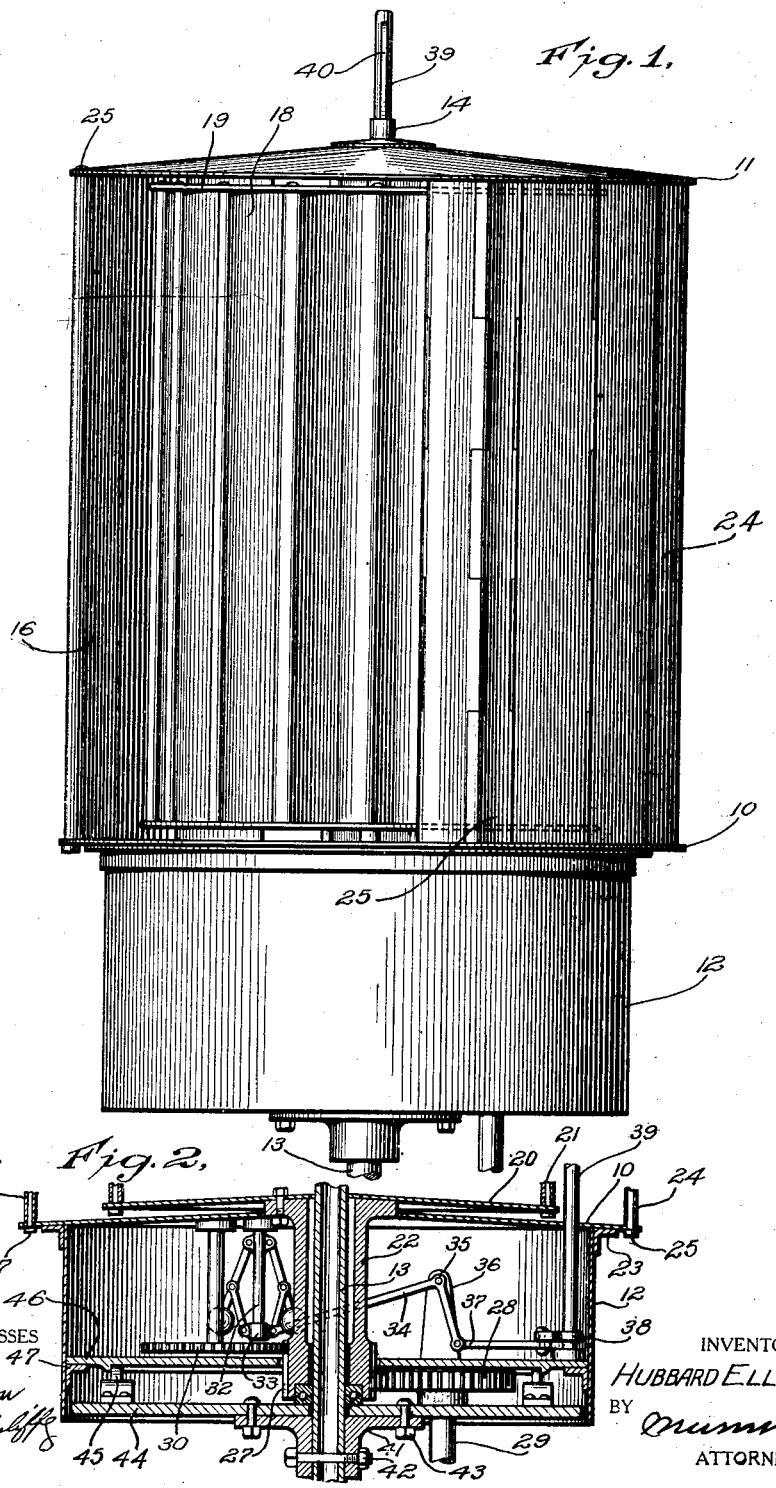
INVENTOR
HUBBARD ELLISON
BY
ATTORNEYS Aug. 23, 1927.

H. ELLISON 1,640,269

WIND ROTOR

Filed June 10, 1926

WITNESSES

INVENTOR
HUBBARD ELLISON
BY
ATTORNEYS

Patented Aug. 23, 1927.

1,640,269

UNITED STATES PATENT OFFICE.

HUBBARD ELLISON, OF LONDON, ONTARIO, CANADA.

WIND ROTOR.

Application filed June 10, 1926. Serial No. 115,080.

My invention relates to a wind motor employing curved sails and shields to determine the extent of the sail area presented to the wind.

The general object of my invention is to provide a novel assemblage of parts of simple construction and arrangement and efficient in regulating the sail area presented to the wind and the area shielded as well as a novel drive assemblage for actuating the driven shaft.

The nature of my invention and its distinguishing features and advantages will clearly appear as the description proceeds. Reference is to be had to the accompanying drawings forming a part of this specification, it being understood that the drawings are merely illustrative of one example of the invention.

Figure 1 is an elevation of a wind motor embodying my invention;

Figure 2 is a vertical section through the chamber containing the drive mechanism and governor, the section being indicated by the line 2—2, Figure 4;

Figure 3:
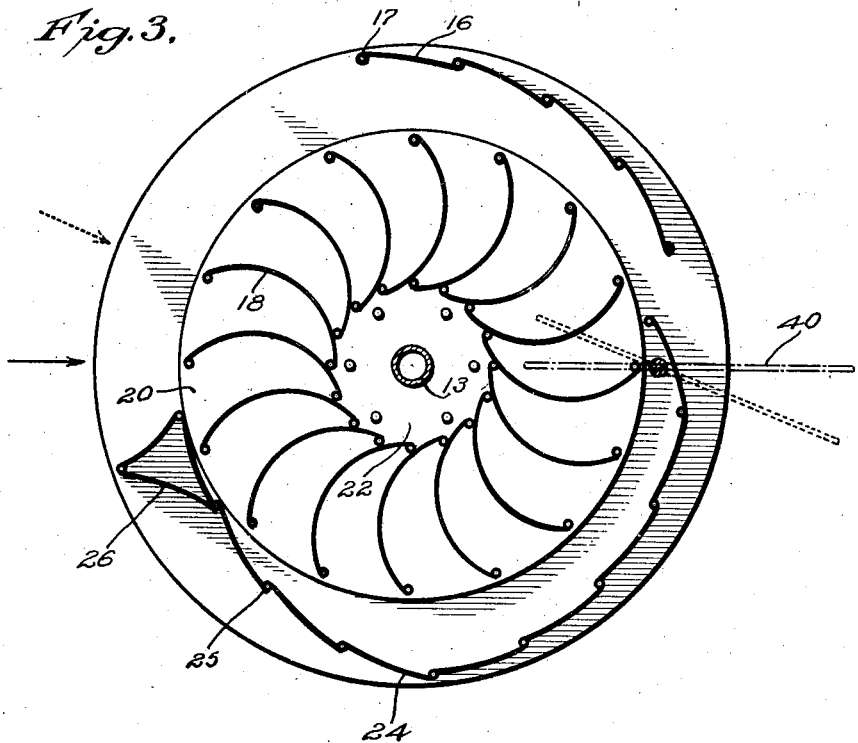
Figure 3 is a horizontal section through the rotor.

In carrying out my invention in accordance with the illustrated example, a bottom plate 10 is provided and a top plate 11. Below the bottom plate is a chamber 12 containing the drive gearing and governor. A mast 13 extends upwardly through the chamber 12 axially through the rotor as well as through the top and bottom plates 10 and 11. The mast 13 at the top receives a cap 14 above the top plate 11. Wind shield blades 16 in continuous arcuate series extend between the plates 10 and 11, one edge of each of which blades is beaded and receives rods 17 riveted to the top and bottom plates.

Curved metal sails 18 in annular series are secured to a top plate 19 and a bottom plate 20. The beaded edges of said sails 18 receive vertical bolts 21 tying the top and bottom plates 19 and 20 together. The bottom plate 20 is secured to a hub 22 revoluble about the mast 13. The casing of the chamber 12 is secured to the plate 10 by angle irons 23. At the opposite side of the motor from the shield 16, shields 24 are provided in series, the beaded or turned edges of which receive riveted rods 25 forming additional tie means between the plates 10 and 11. Said shields 24 extend about the wheel at the opposite side from the wind side. At one end of the series of shields 24 is a triangular structure 26 and the space between said structure 26 and the near end of the series of shields 16 defines the wind entrance to the motor. Between the opposite end of the series of shields 24 and the series of shields 16 is a smaller space through which wind finds exit after turning the rotor.

Figure 4:
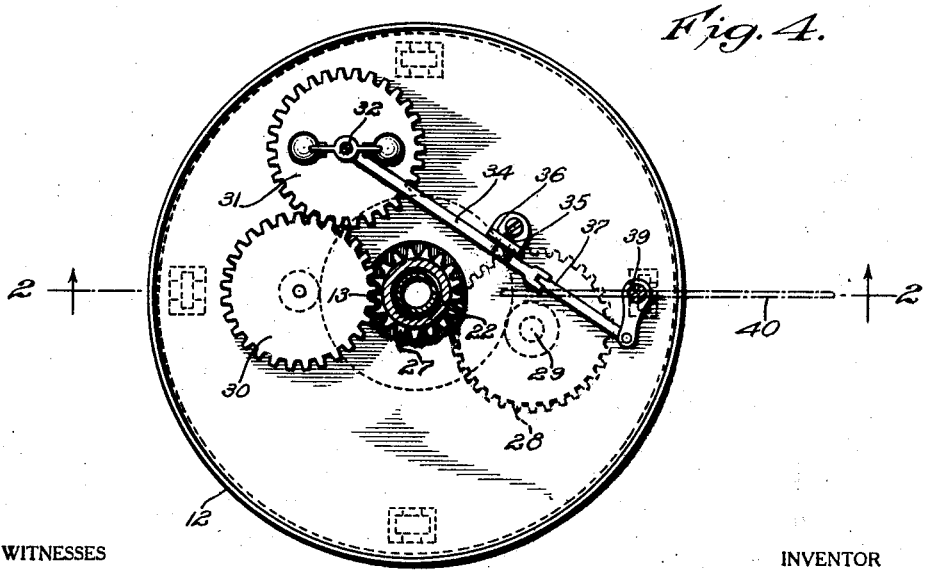
Figure 4 is a sectional plan view of the drive mechanism and governor.

The hub 22 has a broad gear 27 meshing with which is a gear wheel 28 on the power shaft 29. Meshing also with the pinion 27 is a gear wheel 30 which in turn meshes with a gear wheel 31 (Figure 4) on the shaft 32 of a ball governor. The movable collar 33 of the governor subject to the rising and falling movement of the balls, has pivoted thereto, one arm of a bell crank lever 34 fulcrumed as at 35 on a standard 36. The other arm of bellcrank lever 34 connects by a link 37 with an arm 38 on a vertical shaft 39 that rises and projects above the top plate 11 of the motor. Said shaft 39 has secured thereto the wind vane 40.

With the above described construction, the turning of the annular series of sails 18 by wind blowing in the general direction of the arrows in Figure 3, will cause the hub 22 to be revolved and through the pinion 27 and gear wheel 28, the power shaft 29 will be driven. At the same time through the wheels 30 and 31 the governor 32 will be revolved. When the collar 33 rises in response to the centrifugal force of the ball governor, the movement of said collar 33 will through bellcrank 34, link 31 and arm 38, turn the wind vane shaft 39 and swing the wind vane 40 from the position indicated in dot-and-dash lines in Figure 3 to the oblique position indicated by dotted lines in said Figure 3. The wind acting on the vane 40 will then turn the outer structure bodily about the axis of the rotor so that the wind is presented in the direction of the dotted arrow in Figure 3, in which position of the sail wheel or rotor several of the sails 18, exposed to the wind, will receive pressure on the backs thereof while a diminishing number of the sails will receive wind in the front thereof for turning the wheel.

On the mast 13 is a split collar 41 held to the mast by bolts 42. Bolts 43 secure a flange on the split collar to a fixed floor structure 44 on which is mounted a series of rollers 45, disposed 90° apart. Resting on the rollers 45 is a platform 46 to which the casing of the housing 12 is secured by suitable means such as angle irons 47. Thus, the mechanism in the chamber 12, except the driven gear wheel 28 on the power shaft 29, is afforded support on or from the platform 46.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a wind motor a wind driven rotor having an annular series of sails, a mast about the axis of which the rotor turns, a hub on said rotor turnable with said mast, a fixed floor secured to the mast, rollers on the floor at intervals, a structure outside of the rotor, including a platform resting on said rollers, as well as a housing secured to said platform, a power shaft, means to drive said shaft by the turning of the rotor, a governor, a wind vane, said structure being turnable bodily by wind pressure on said vane, and means to swing said vane by the movements of the governor, said governor and said last mentioned means being mounted above said platform and the turning of said structure bodily by the vane serving to reduce or increase the effective sail area of the rotor presented to the wind.

2. In a wind motor a wind driven rotor having sails, a casing below said rotor, top and bottom plates above and below the sails, connections between said top and bottom plates, said casing below the rotor being secured to said bottom plate, a mast extending through the rotor and through said top and bottom plates, a fixed floor in rigid relation to the mast, rollers on said floor, a structure outside of said rotor, said structure including a platform on said rollers, as well as a wind vane above the said top plate, a shaft to which said wind vane is fixedly secured, a governor and means connecting the governor with the shaft of the wind vane, said structure being adapted to be turned bodily by wind pressure on said vane, said top and bottom plates being supported on said casing and the governor and the means connecting the governor with the wind vane shaft being supported on said platform, the turning of said structure bodily by the vane serving to reduce or increase the effective said area of the rotor presented to the wind.

3. In a wind motor, a wind driven rotor having a series of sails, a structure outside of said wind wheel, a series of wind shields on said structure at one side of the rotor, a second set of shields at the opposite side of said structure and also outside of the rotor, a wind vane on said structure, a shaft on which said wind vane is mounted, a governor, and connections between said wind vane shaft and the governor to swing the said shaft and the wind vane at an angle to the wind upon a predetermined speed of the governor to cause the wind to turn said structure relatively to said rotor to vary the effective sail area presented to the wind.

4. In a wind motor a wind driven rotor having an annular series of sails, a structure outside of said rotor, a series of wind shields on said structure at one side of the rotor, a second set of shields at the opposite side of said structure and also outside of the rotor and a wind vane on said structure and adapted to cause a bodily turning of said structure under wind pressure about the axis of the rotor to vary the effective area presented by the sails to the wind.

HUBBARD ELLISON.